United States Patent
Tsai et al.

(10) Patent No.: US 11,032,851 B2
(45) Date of Patent: Jun. 8, 2021

(54) QCL IN RACH DIFFERENT FROM THAT IN OTHER SIGNALS

(71) Applicant: Mediatek Inc., Hsin-Chu (TW)

(72) Inventors: Chiou-Wei Tsai, Hsinchu (TW); Chia-Hao Yu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 171 days.

(21) Appl. No.: 16/276,783

(22) Filed: Feb. 15, 2019

(65) Prior Publication Data

US 2019/0261431 A1    Aug. 22, 2019

Related U.S. Application Data

(60) Provisional application No. 62/631,641, filed on Feb. 17, 2018.

(51) Int. Cl.
| | |
|---|---|
| *H04L 5/00* | (2006.01) |
| *H04W 56/00* | (2009.01) |
| *H04L 1/00* | (2006.01) |
| *H04W 24/10* | (2009.01) |
| *H04W 76/11* | (2018.01) |
| *H04W 72/04* | (2009.01) |

(Continued)

(52) U.S. Cl.
CPC ....... *H04W 74/0833* (2013.01); *H04L 1/0026* (2013.01); *H04L 5/005* (2013.01); *H04L 5/0048* (2013.01); *H04W 24/10* (2013.01); *H04W 56/001* (2013.01); *H04W 72/042* (2013.01); *H04W 72/1289* (2013.01); *H04W 72/14* (2013.01); *H04W 74/002* (2013.01); *H04W 74/0841* (2013.01); *H04W 76/11* (2018.02); *H04W 74/0866* (2013.01)

(58) Field of Classification Search
CPC combination set(s) only.
See application file for complete search history.

(56) References Cited

U.S. PATENT DOCUMENTS

| | | | |
|---|---|---|---|
| 2015/0208394 A1* | 7/2015 | Seo | H04W 72/042 370/329 |
| 2016/0338111 A1* | 11/2016 | Han | H04L 5/0053 |

(Continued)

FOREIGN PATENT DOCUMENTS

| | | |
|---|---|---|
| CN | 107517433 A | 12/2017 |
| WO | 2017167290 A1 | 10/2017 |

OTHER PUBLICATIONS

International Search Report of PCT/CN2019/075315, dated May 9, 2019.

*Primary Examiner* — Xavier S Wong
(74) *Attorney, Agent, or Firm* — Locke Lord LLP; Tim Tingkang Xia, Esq.

(57) ABSTRACT

A UE determines (a) resources of a PDCCH indicating a PDSCH that contains a random access message or indicating an uplink grant for transmitting a random access message and (b) resources of a second PDCCH. The UE further determines, in a time domain, (a) that the first PDCCH overlaps with the second PDCCH, (b) that the first PDCCH overlaps with a second PDSCH that contains system data or user data and indicated by the second PDCCH, (c) that the first PDSCH overlaps with the second PDCCH, or (d) that the first PDSCH overlaps with the second PDSCH. The UE then determines that monitoring the second PDCCH is an unexpected operation.

12 Claims, 12 Drawing Sheets

(51) Int. Cl.
*H04W 72/12* (2009.01)
*H04W 72/14* (2009.01)
*H04W 74/00* (2009.01)
*H04W 74/08* (2009.01)

(56) References Cited

U.S. PATENT DOCUMENTS

2019/0021119 A1\* 1/2019 Ng .................... H04W 72/0453
2019/0082448 A1\* 3/2019 Nogami ............ H04W 72/1263
2019/0239245 A1\* 8/2019 Davydov .............. H04W 16/28
2020/0305088 A1\* 9/2020 Nory .................. H04W 52/242
2020/0359407 A1\* 11/2020 Takeda .................. H04L 5/0023

\* cited by examiner

QCL IN RACH DIFFERENT FROM THAT IN OTHER SIGNALS

CROSS-REFERENCE TO RELATED APPLICATION(S)

This application claims the benefits of U.S. Provisional Application Ser. No. 62/631,641, entitled "RACH DESIGN FOR RRC CONNECTED MODE" and filed on Feb. 17, 2018, which is expressly incorporated by reference herein in their entirety.

BACKGROUND

Field

The present disclosure relates generally to communication systems, and more particularly, to a random access procedure employed by a user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines, based on the one or more configurations, (a) resources of a first physical downlink control channel (PDCCH) indicating a first physical downlink shared channel (PDSCH) that contains a random access message or indicating an uplink grant for transmitting a random access message and (b) resources of a second PDCCH. The UE further determines, in a time domain, (a) that the first PDCCH overlaps with the second PDCCH, (b) that the first PDCCH overlaps with a second PDSCH that contains system data or user data and indicated by the second PDCCH, (c) that the first PDSCH overlaps with the second PDCCH, or (d) that the first PDSCH overlaps with the second PDSCH. The UE also determines that a first down-link reference signal for monitoring the first PDCCH and a second down-link reference signal for monitoring the second PDCCH are not quasi-colocated. The UE then determines that monitoring the second PDCCH is an unexpected operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
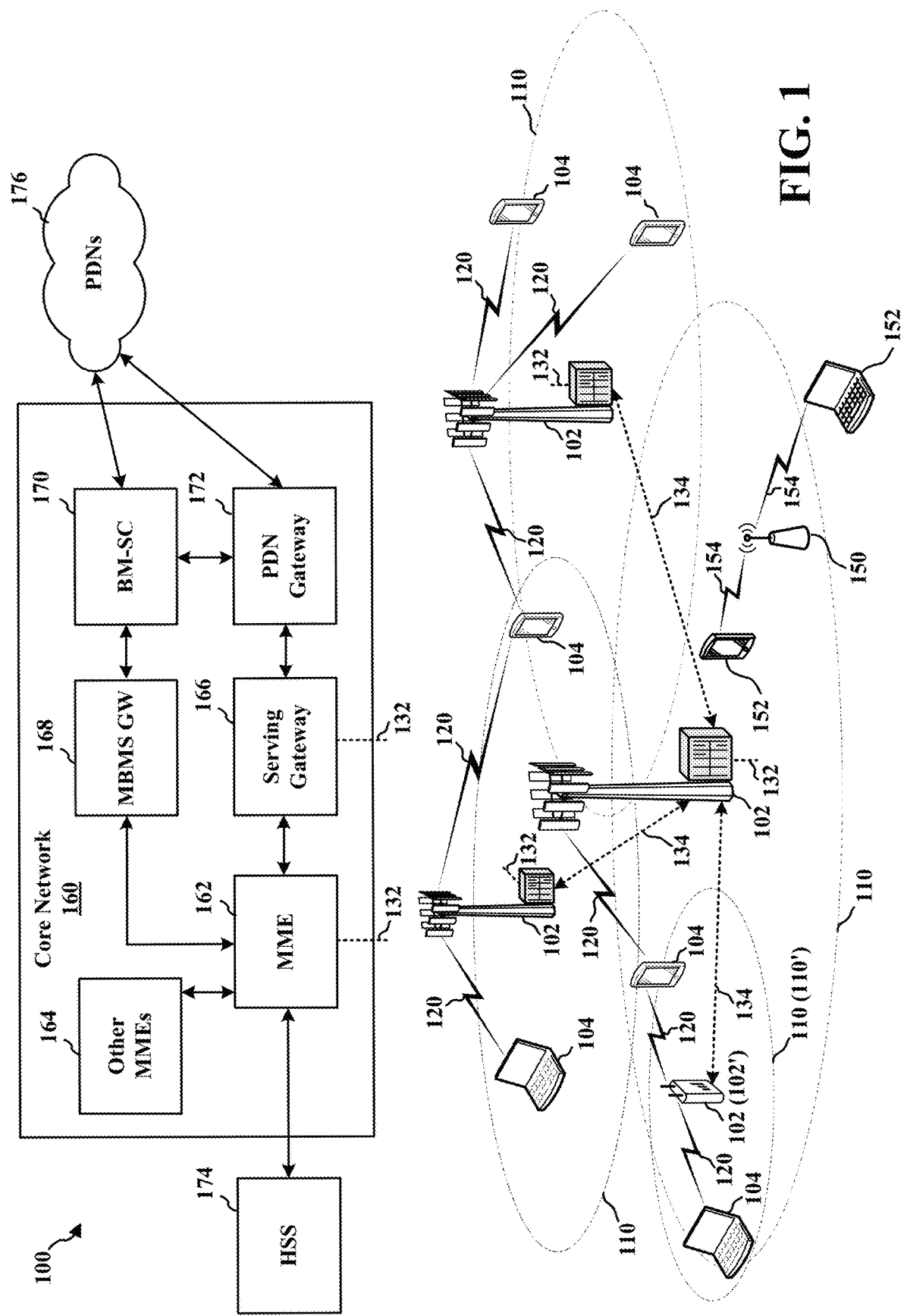
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
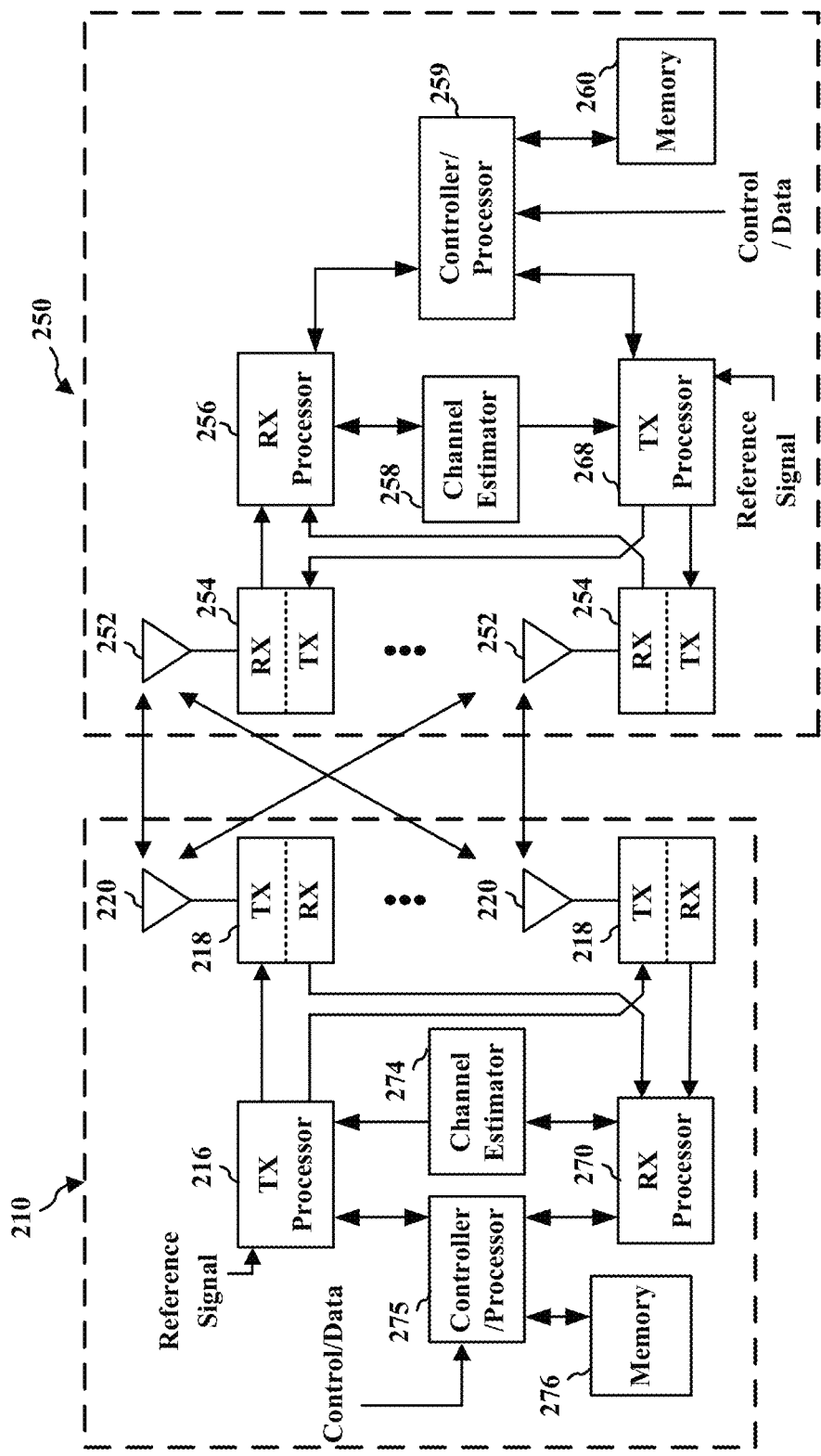
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
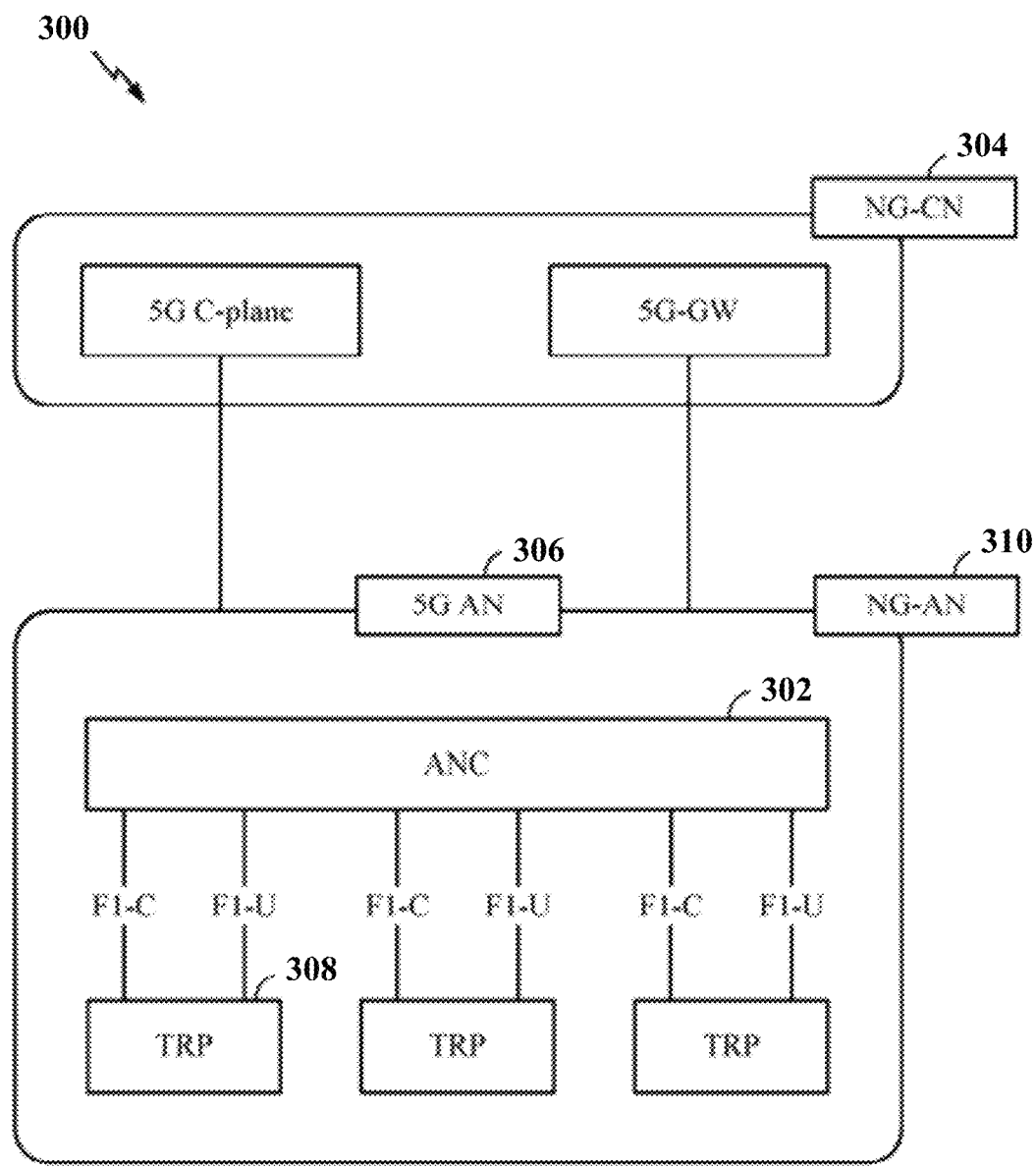
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
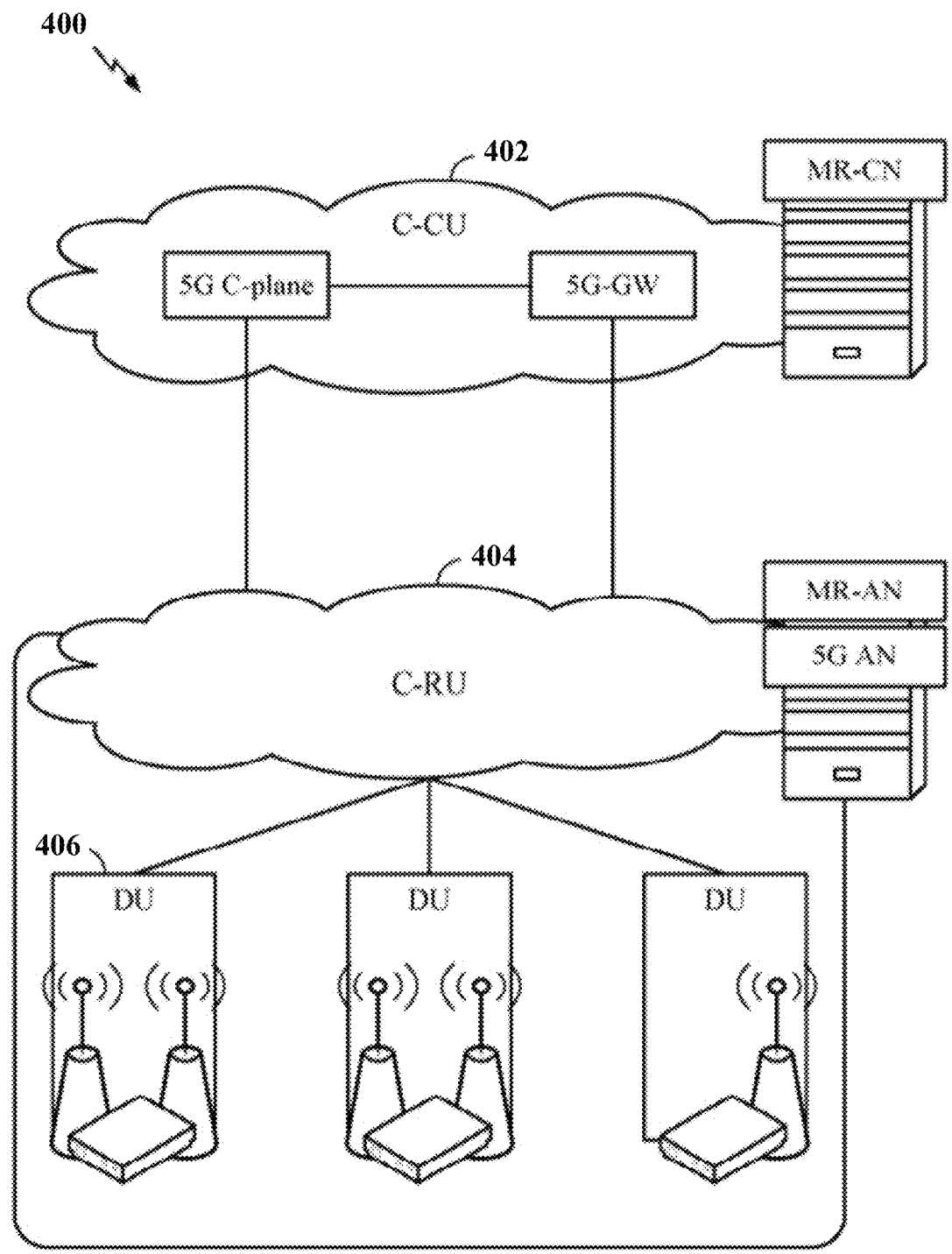
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
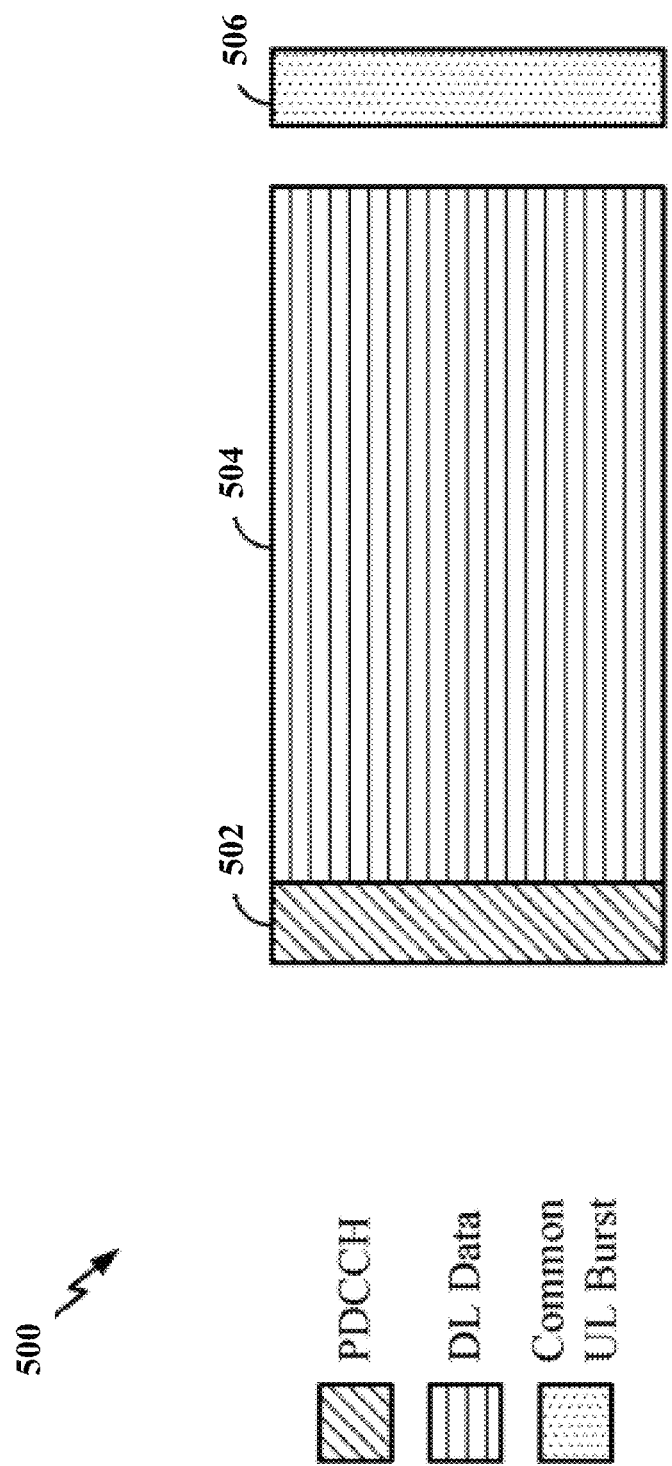
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
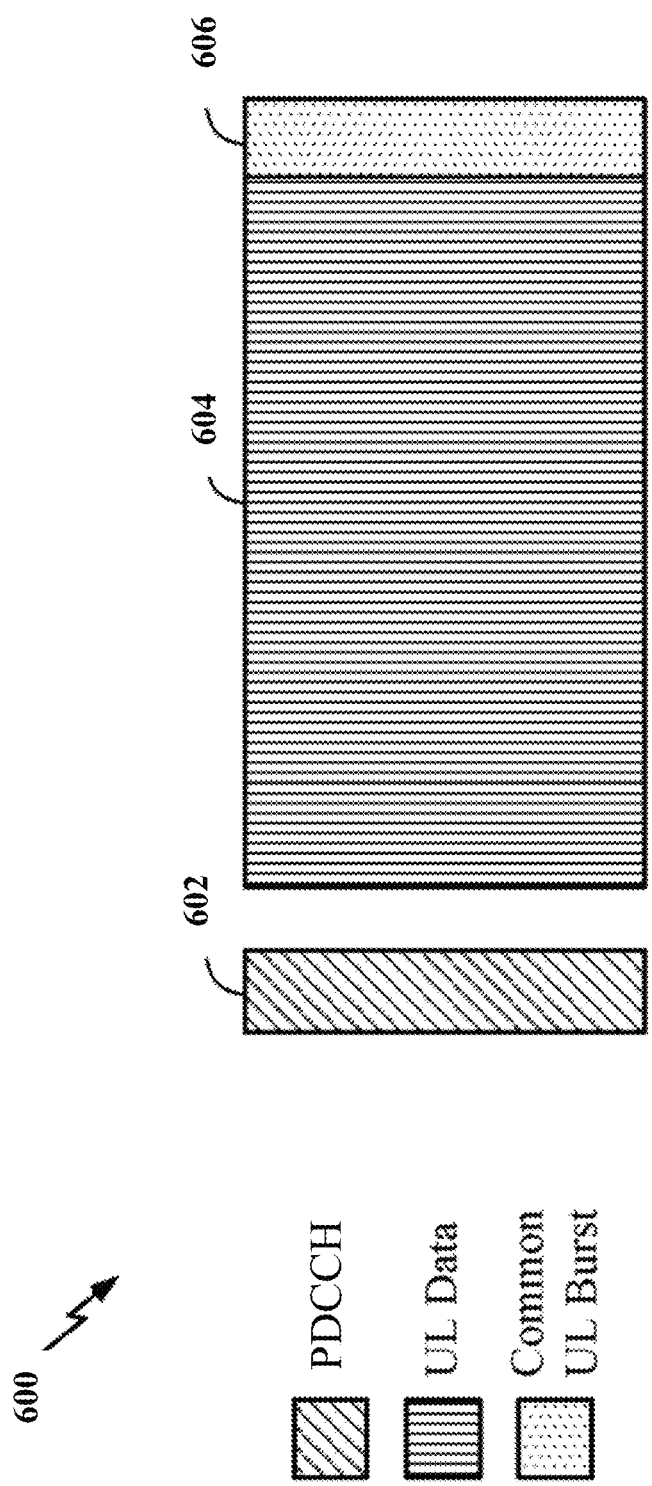
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 606 described above with reference to FIG. 6. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
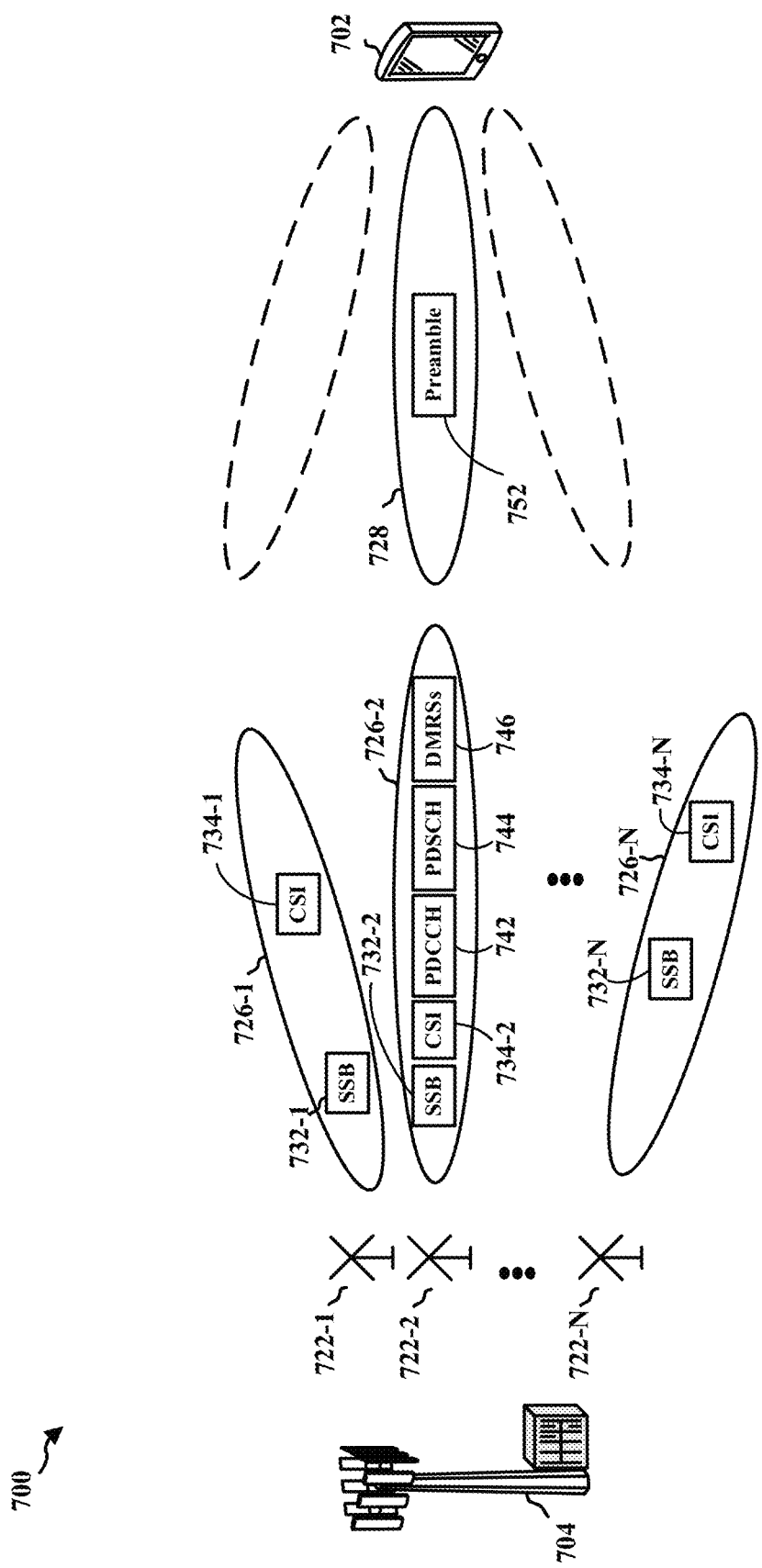
FIG. 7 is a diagram illustrating communications between a base station and UE.

FIG. 7 is a diagram 700 illustrating communications between a base station 702 and a UE 704. The base station 702 may operates antenna ports 722-1 to 722-N. The base station 702 provides transmitter side beams 726-1 to 726-N at different directions. The UE 704 may use a random access procedure to gain access to a cell of the base station 702. In this example, to facilitate a UE to perform the random access procedure, the base station 702 transmits a set of synchronization signal blocks (SSBs) including SSBs 732-1 to 732-N, which are associated with the transmitter side beams 726-1 to 726-N, respectively. More specifically, the Primary Synchronization Signal (PSS) and the Secondary Synchronization Signal (SSS), together with the Physical Broadcast Channel (PBCH), are jointly referred to as an SSB. Each of the SSBs 732-1 to 732-N may include one or more Demodulation Reference Signals (DMRSs) for PBCH. The DMRSs are intended for channel estimation at a UE as part of coherent demodulation.

Further, the base station 702 may transmit CSI-RS sets 734-1 to 734-N that are specific to the UE 704 by using the transmitter side beams 726-1 to 726-N, respectively. A CSI-RS is used by the UE to estimate the channel and report channel state information (CSI) to the base station. A CSI-RS is configured on a per-device basis.

In certain configurations, the UE 704 may select one of the transmitter side beams 726-1 to 726-N randomly or based on a rule for deriving a corresponding preamble sequence used in the random access procedure. In certain configurations, the UE 704 may adjust the direction of a receiver side beam 728 to detect and measure the SSBs 732-1 to 732-N or the CSI-RS sets 734-1 to 734-N. Based on the detection and/or measurements (e.g., SNR measurements), the UE 704 may select a direction of the receiver side beam 728 and one of the transmitter side beams 726-1 to 726-N for deriving a corresponding preamble sequence used in the random access procedure.

In one example, the UE 704 may select the transmitter side beam 726-2 for deriving an associated preamble sequence for use in the random access procedure. More specifically, the UE 704 is configured with one or more random access resources associated with each the SSBs 732-1 to 732-N and/or one or more random access resources associated with each the CSI-RS sets 734-1 to 734-N.

Accordingly, the UE 704 may select a random access resource associated with the down-link reference signal (e.g., SSB or CSI-RS) of the transmitter side beam 726-2 (i.e., the selected one of the transmitter side beams 726-1 to 726-N). Subsequently, the UE 704 sends a preamble sequence 752 to the base station 702 through the receiver side beam 728 (by assuming a corresponding UE transmit beam can be derived from the receiver side beam 828) on the selected random access resource. Based on the location of the random access resource in time domain and frequency domain, the base station 702 can determine the transmitter side beam selected by the UE 704.

Subsequently, the base station 702 and the UE 704 can further complete the random access procedure such that the base station 702 and the UE 704 can communicate through the transmitter side beam 726-2 and the receiver side beam 728. As such, the UE 704 is in a connected state (e.g., RRC CONNECTED) with the base station 702. The base station 702 may use the transmitter side beam 726-2 to transmit to the UE 704 a PDCCH 742, a PDSCH 744, and associated DMRSs 746.

Figure 8:
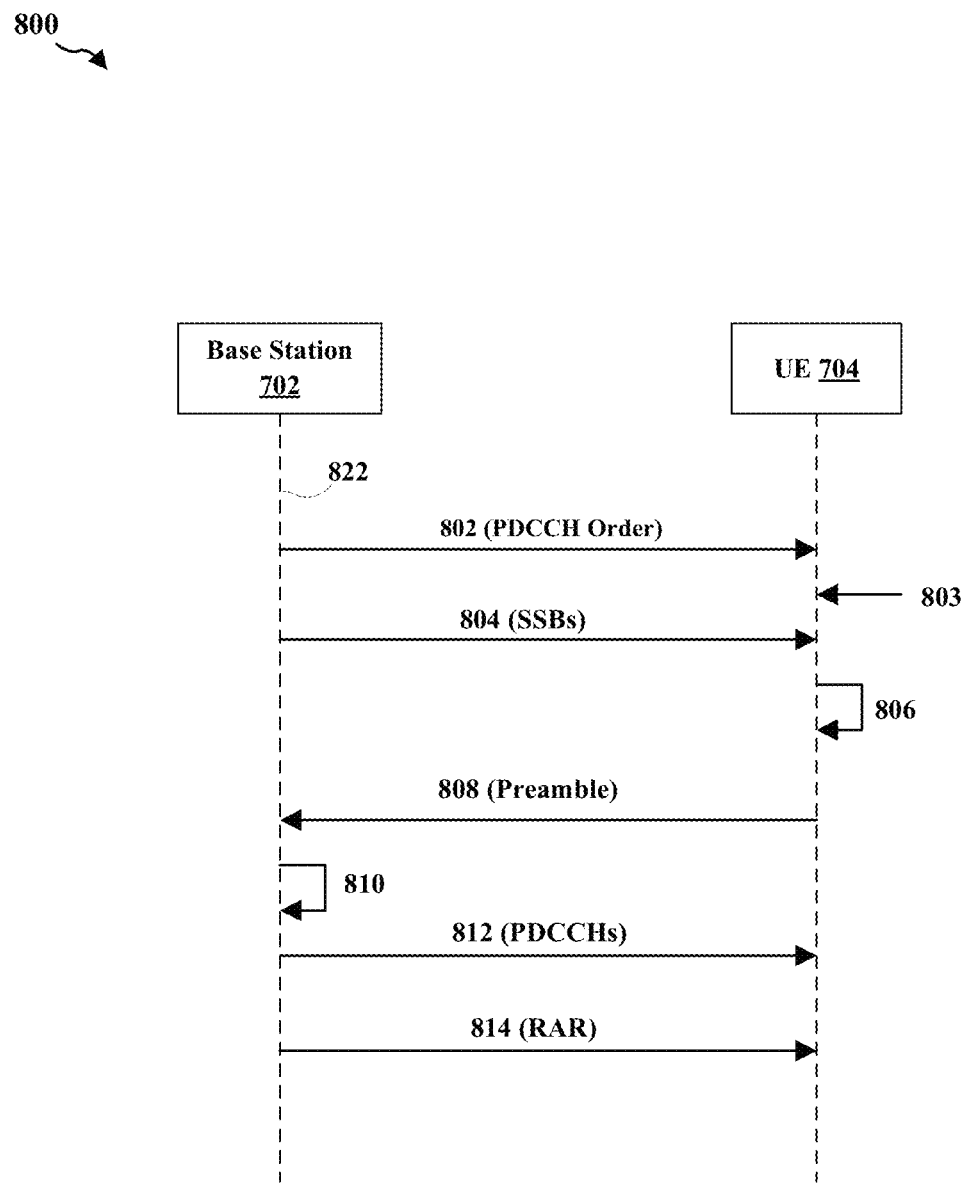
FIG. 8 is a diagram illustrating a random access procedure of a UE in a connected state.

FIG. 8 is diagram 800 illustrating a random access procedure of a UE in a connected state. In certain circumstances, the UE 704, although in a connected state, may need to conduct the random access procedure with the base station 702 or another base station. In this example, as described supra referring to FIG. 7, the UE 704 is connected to the base station 702. The UE 704 may receive a request (e.g., a PDCCH order) from the base station 702 to initiate a random access procedure again. The UE 704 may detect an up-link data arrival without up-link synchronization and, thus, may conduct the random access procedure with the base station 702. The UE 704 may detect a down-link data arrival without up-link synchronization and, thus, may conduct the random access procedure with the base station 702 and, thus, may conduct the random access procedure with the base station 702. The UE 704 may decide to recover a beam and, thus, may conduct the random access procedure with the base station 702. The UE 704 may be handed over from the base station 702 to another base station and, thus, may conduct the random access procedure with the other base station.

In this example, at procedure 802, the base station 702 sends a PDCCH order to the UE 704. In particular, the PDCCH order may be transmitted by using the transmitter side beam 726-2. Accordingly, upon received the PDCCH order, at procedure 803, the UE 704 initiates a random access procedure while in a connected state. In another example, the UE 704 may detect a beam failure and internally generates a beam failure recovery request. Accordingly, the UE 704 can also initiate a random access procedure while in a connected state. At procedure 804, as described supra, the base station 702 sends the SSBs 732-1 to 732-N and/or the CSI-RS sets 734-1 to 734-N associated with the transmitter side beams 726-1 to 726-N, respectively. The UE 704 may detect some or all of the SSBs 732-1 to 732-N. Note that procedure 804 can also take place before procedure 802.

At procedure 806, as described supra, in certain configurations, the UE 704 may select one of the transmitter side beams 726-1 to 726-N randomly or based on the measurement result. As an example, the base station 702 may select the transmitter side beam 726-1 for deriving an associated preamble sequence 752 for use in the random access procedure.

Accordingly, the base station 702 may use a correspondent beam of the transmitter side beam 726-2 to receive the preamble sequence 752, which is transmitted on a random access resource associated with the down-link reference signals of the transmitter side beam 726-1. The UE 704 determines a timing advance (TA) for the UE 704 based on the preamble sequence 752 received through the transmitter side beam 726-2.

As such, the base station 702 may receive the preamble sequence 752 on the transmitter side beam 726-2. The network of the base station 702 can also determine that the preamble sequence 752 was transmitted at a random access resource associated with the SSB 732-2 and/or the CSI-RS set 734-2 of the transmitter side beam 726-2. As such, the network learns that the UE 704 selected the transmitter side beam 726-2.

At procedure 810, the base station 702 (under the control of the network) generates a random-access response (RAR). The RAR may include information about the preamble sequence 752 the network detected and for which the response is valid, a TA calculated by the network based on the preamble sequence receive timing, a scheduling grant indicating resources the UE 704 will use for the transmission of the subsequent message, and/or a temporary identity, the TC-RNTI, used for further communication between the device and the network.

At procedure 812, the base station 702 transmits a PDCCH scheduling command for scheduling transmission of the RAR by using the transmitter side beam 726-2. Accordingly, DMRS of the PDCCH scheduling command and DMRS of the PDCCH order at procedure 802 are quasi-colocated. Further, the PDCCH scheduling command may be scrambled by a cell radio network temporary identifier (C-RNTI) of the UE 704, which is known to the network. Further, as described supra, the UE 704 is in a connected state. The serving beam from the base station 702 to the UE 704 may be the transmitter side beam 726-1. At or about the same time the base station 702 sends the PDCCH scheduling command for scheduling transmission of the RAR on the transmitter side beam 726-2, the base station 702 may also send a PDCCH on the transmitter side beam 726-1 for scheduling a PDSCH carrying user data.

At procedure 814, the base station 702 transmits the RAR to the UE 704 on the transmitter side beam 726-2. The RAR may be transmitted in a conventional downlink PDSCH. As such, the random access procedure completes for the UE 704, which is in a connected state.

Figure 9:
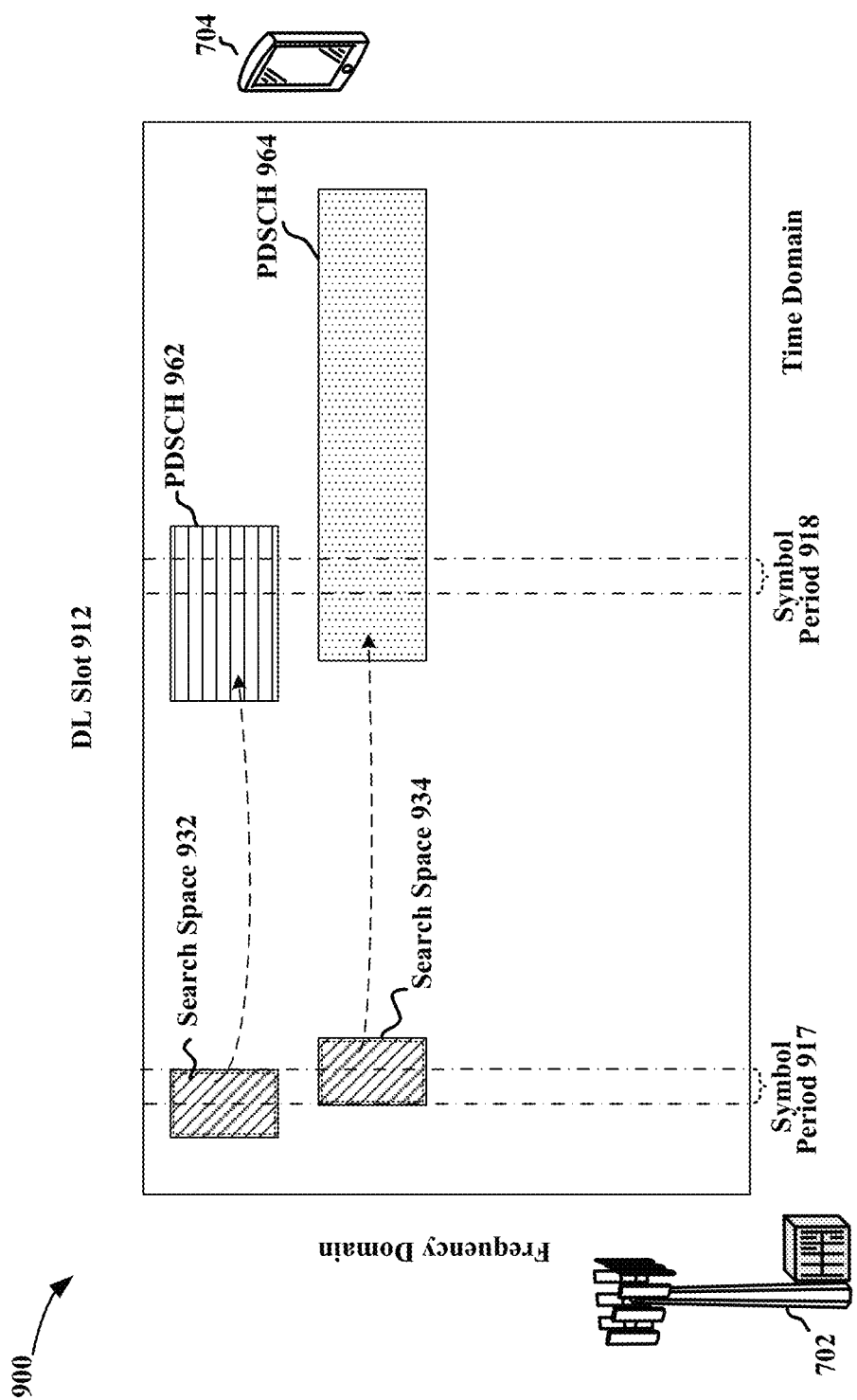
FIG. 9 is a diagram illustrating that a UE decodes PDCCHs and PDSCHs in a time slot.

FIG. 9 is a diagram 900 illustrating that a UE decodes PDCCHs and PDSCHs in a time slot. The UE 704 receives CORESET configurations and search space set configurations from the base station 702 via UE-specific RRC signaling. Based on those configurations, the UE 704 can determine PDCCH common search space sets and UE specific PDCCH search space sets assigned to the UE 704. Further, the CORESET configuration contains a field specifying QCL association of the serving beam (e.g., the transmitter side beam 726-1 in this example). In particular, the field specifies an antenna port quasi-colocations, from a set of antenna port quasi-colocations provided by higher layer parameter "TCI-StatesPDCCH," indicating quasi co-location information of the DM-RS antenna port for PDCCH reception.

Further, a PDCCH common search space set may be a Type 0 PDCCH common search space set, which may be configured by parameter "pdcch-ConfigSIB1" in MIB or by parameter "searchSpaceSIB1" in PDCCH-ConfigCommon or by parameter "searchSpaceZero" in PDCCH-Config-Common for a DCI format with CRC scrambled by a SI-RNTI.

A PDCCH common search space set may be a Type 0A PDCCH common search space set, which is configured by "searchSpaceOtherSystemInformation" in PDCCH-Config-Common for a DCI format with CRC scrambled by a SI-RNTI.

A PDCCH common search space set may be a Type 1 PDCCH common search space set, which is configured by "ra-SearchSpace" in PDCCH-ConfigCommon for a DCI format with CRC scrambled by a RA-RNTI or a TC-RNTI.

A PDCCH common search space set may be a Type 2 PDCCH common search space set, which is configured by "pagingSearchSpace" in PDCCH-ConfigCommon for a DCI format with CRC scrambled by a P-RNTI.

A PDCCH common search space set may be a Type 3 PDCCH common search space set, which is configured by "SearchSpace" in PDCCH-Config with "searchSpaceType=common" for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s).

A UE specific PDCCH search space set may be configured by "SearchSpace" in PDCCH-Config with "searchSpaceType=ue-Specific" for DCI formats with CRC scrambled by C-RNTI, MCS-C-RNTI, SP-CSI-RNTI, or CS-RNTI(s).

In this example, the UE 704 is allocated, among other search space sets, a search space set 932 and a search space set 934 in a slot 912. Further, based on the configurations, the UE 704 determines that the search space set 932 is a Type 1 PDCCH common search space set and that the search space set 934 is a Type 0/0A/2/3 PDCCH common search space set or a UE specific PDCCH search space set.

As described supra referring to FIGS. 7-8, at procedure 806, the UE 704 selected down-link reference signals of the transmitter side beam 726-2. At procedure 808, the UE 704 indicates the selected down-link reference signals to the base station 702. Accordingly, the UE 704 needs to monitor the search space set 932 on the transmitter side beam 726-2 to detect a PDCCH. The PDCCH may indicate resources of a PDSCH 962, which may be used to carry an RAR (as described supra referring to procedure 814). In other circumstances, the PDCCH may indicate a PDSCH that carry a downlink random access message for contention resolution, where the PDCCH is scrambled by either Temporary C-RNTI (TC-RNTI) or C-RNTI. In other circumstances, the PDCCH may carry an uplink grant for an uplink random access message that indicates the identity of the UE 704, where the PDCCH is scrambled by Temporary C-RNTI (TC-RNTI).

Further, the UE 704 may also monitor the search space set 934 on the transmitter side beam 726-1, which is the serving beam, to detect a PDCCH scheduling a PDSCH that carries user data or system data. In this example, the search space set 934 may contain a PDCCH indicating a PDSCH 964.

In this example, the UE 704 determines, e.g., based on the quasi-colocation information in the CORESET configuration, that the down-link reference signal of the transmitter side beam 726-2 is not quasi-colocated with the DMRS associated with the transmitter side beam 726-1.

In this example, the UE 704 further determines that the search space set 932 and the search space set 932 overlap with each other in the time domain. More specifically, both the search space set 932 and the search space set 934 occupies a symbol period 917.

In this situation, the UE 704 determines that an unexpected event has occurred. The UE 704 is not expected to monitor PDCCHs on the transmitter side beam 726-1 and the transmitter side beam 726-2 simultaneously. Accordingly, the UE 704 may choose to only monitor and blind-decode the search space set 932 to complete the random access procedure, but not monitor or blind-decode the search space set 934.

In a second example, the search space set 932 and the search space set 934 may not overlap in the time domain. Therefore, the UE 704 may perform blind decoding on the search space set 932 and the search space set 934. In this example, the search space set 932 has a PDCCH carrying DCI scrambled by a RA-RNTI or a TC-RNTI and indicating the PDSCH 962. The search space set 934 has a PDCCH carrying DCI scrambled by RNTI other than a RA-RNTI or a TC-RNTI and indicating the PDSCH 964.

Based on the DCI carried in the search space set 932 and the search space set 934, the UE 704 determines resources of the PDSCH 962 and the PDSCH 964. In this example, the UE 704 further determines that the PDSCH 962 and the PDSCH 964 overlap. For example, both the PDSCH 962 and the PDSCH 964 occupy the symbol period 918.

In this situation, the UE 704 determines that an unexpected event has occurred. The UE 704 is not expected to decode PDSCHs on the transmitter side beam 726-1 and the transmitter side beam 726-2 simultaneously. Accordingly, the UE 704 may choose to only decode the PDSCH 962 to complete the random access procedure, but not to decode the PDSCH 964.

In a third example, the search space set 932 overlaps with the PDSCH 964 (not shown in FIG. 9). In this situation, the UE 704 determines that an unexpected event has occurred. The UE 704 is not expected to monitor a PDCCH on the transmitter side beam 726-1 and decode a PDSCH on the transmitter side beam 726-2 simultaneously. Accordingly, the UE 704 may choose to only monitor the search space set 932 to complete the random access procedure, but not to decode the PDSCH 964.

In a fourth example, the search space set 934 overlaps with the PDSCH 962 (not shown in FIG. 9). In this situation, the UE 704 determines that an unexpected event has occurred. The UE 704 is not expected to monitor a PDCCH on the transmitter side beam 726-2 and decode a PDSCH on the transmitter side beam 726-1 simultaneously. Accordingly, the UE 704 may choose to decode the PDSCH 962 to complete the random access procedure, but not to monitor the search space set 934.

Figure 10:
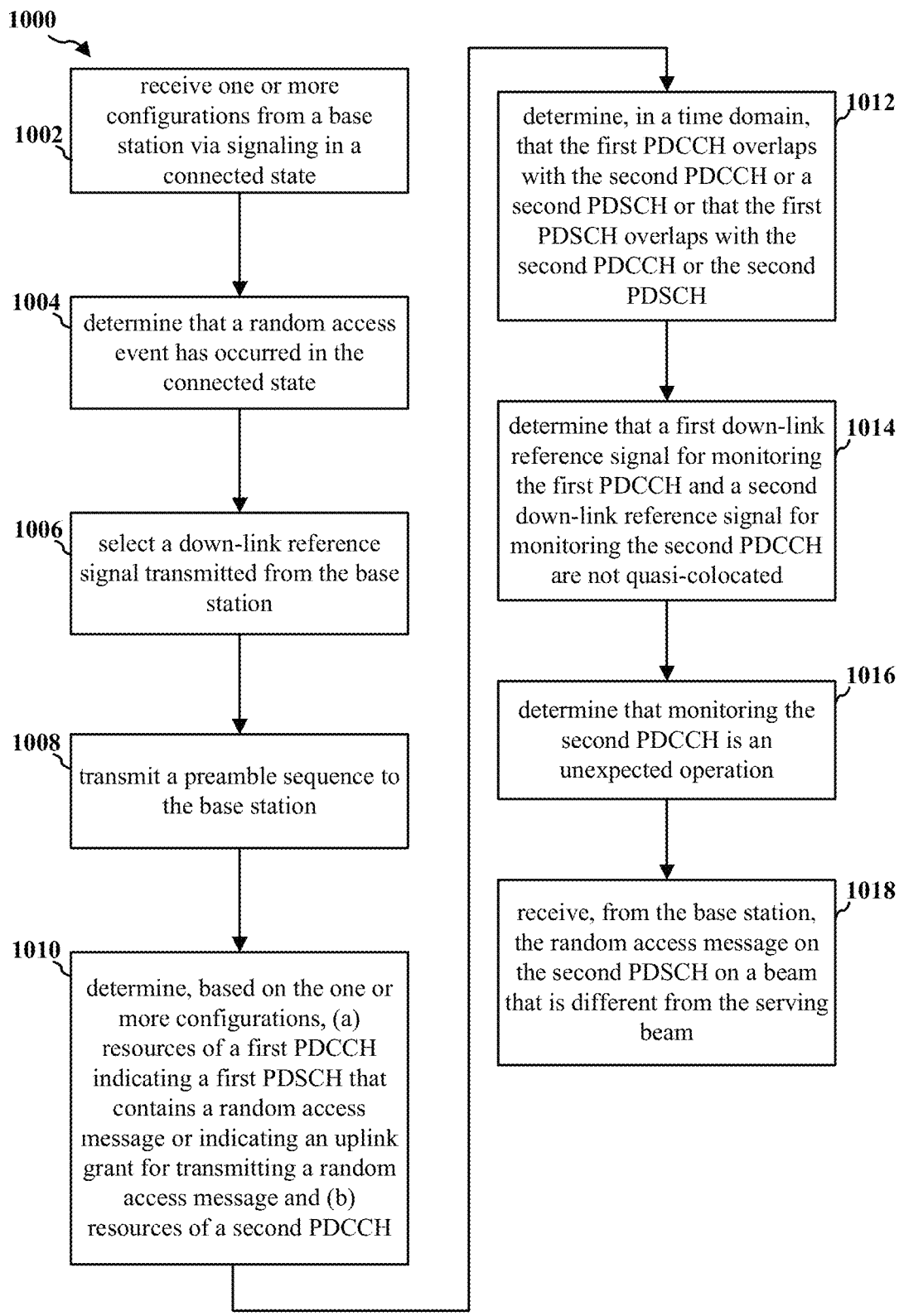
FIG. 10 is a flow chart of a method (process) for monitoring PDCCHs.

FIG. 10 is a flow chart 1000 of a method (process) for monitoring PDCCHs. The method may be performed by a UE (e.g., the UE 704, the apparatus 1102, and the apparatus 1102'). At operation 1002, the UE receives one or more configurations (e.g., a CORESET configuration, a search space set configuration) from a base station via signaling in a connected state. At operation 1004, the UE determines that a random access event (e.g., the PDCCH order in procedure 802) has occurred in the connected state. At operation 1006, the UE selects a down-link reference signal (e.g., the SSB 732-2, the CSI-RS set 734-2) transmitted from the base station and that is not quasi-colocated with a serving beam (e.g., the transmitter side beam 726-1) of from the base station to the UE. At operation 1008, the UE transmits a preamble sequence (e.g., the preamble sequence 752) to the base station using random access sources indicating the selected down-link reference signal.

At operation 1010, the UE determines, based on the one or more configurations, (a) resources of a first PDCCH (e.g., the PDCCH in the search space set 932) indicating a first PDSCH (e.g., the PDSCH 962) that contains a random access message (e.g., the RAR in procedure 814) or indicating an uplink grant for transmitting a random access message and (b) resources of a second PDCCH (e.g., the PDCCH in the search space set 934).

At operation 1012, the UE determines, in a time domain, (a) that the first PDCCH overlaps with the second PDCCH, (b) that the first PDCCH overlaps with a second PDSCH that contains system data or user data and indicated by the second PDCCH, (c) that the first PDSCH overlaps with the second PDCCH, or (d) that the first PDSCH overlaps with the second PDSCH.

At operation 1014, the UE determines that a first down-link reference signal (e.g., the SSB 732-2, CSI-RS set 734-2) for monitoring the first PDCCH and a second down-link reference signal (e.g., DMRS on the transmitter side beam 726-1) for monitoring the second PDCCH are not quasi-colocated. In certain configurations, the first down-link reference signal is a channel state information reference signal or a synchronization signal block. At operation 1016, the UE determines that monitoring the second PDCCH is an unexpected operation. At operation 1018, the UE receives, from the base station, the random access message on the second PDSCH on a beam that is different from the serving beam.

In certain circumstances, the first PDCCH overlaps with the second PDCCH. The UE monitors the first PDCCH. The UE refrains from monitoring the second PDCCH. In certain circumstances, the first PDCCH overlaps with the second PDSCH. The UE monitors the first PDCCH. The UE refrains from decoding the second PDSCH. In certain circumstances, the first PDSCH overlaps with the second PDCCH. The UE decodes the first PDSCH. The UE refrains from monitoring the second PDCCH. In certain circumstances, the first PDSCH overlaps with the second PDSCH. The UE decodes the first PDSCH. The UE refrains from decoding the second PDSCH.

In certain configurations, the first PDCCH is scrambled with a random access radio network temporary identifier (RA-RNTI) and the second PDCCH is scrambled with a radio network temporary identifier (RNTI) other than the RA-RNTI. In certain configurations, the first PDCCH is scrambled with a temporary cell radio network temporary identifier (TC-RNTI) and the second PDCCH is scrambled with a radio network temporary identifier (RNTI) other than the TC-RNTI. In certain configurations, the first PDCCH is located in a Type 1 PDCCH common search space set. The second PDCCH is located in a Type 0 PDCCH common search space set, a Type 0A PDCCH common search space set, a Type 2 PDCCH common search space set, a Type 3 PDCCH common search space set, or a UE specific PDCCH search space set.

Figure 11:
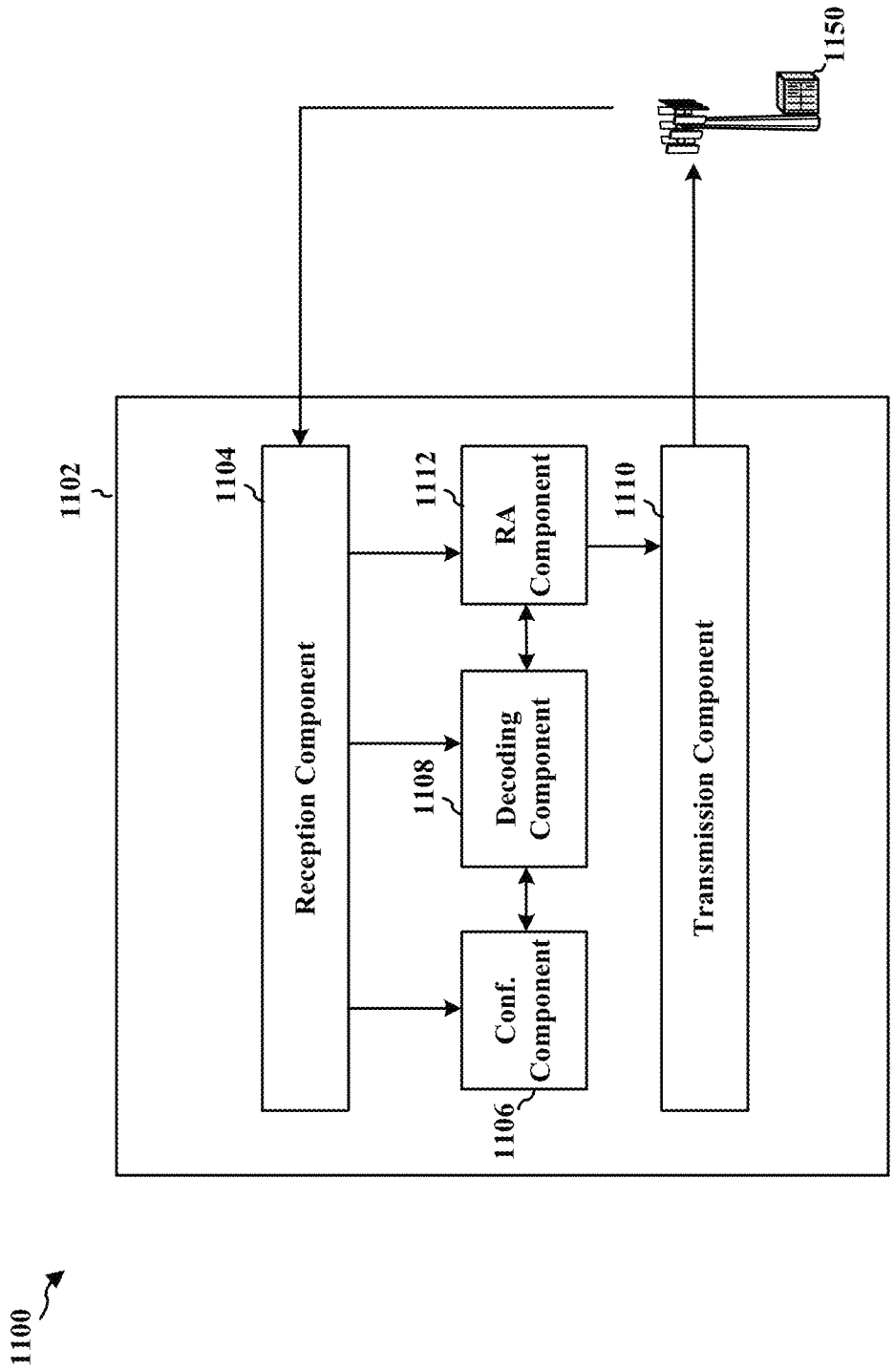
FIG. 11 is a conceptual data flow diagram illustrating the data flow between different components/means in an exemplary apparatus.

FIG. 11 is a conceptual data flow diagram 1100 illustrating the data flow between different components/means in an exemplary apparatus 1102. The apparatus 1102 may be a UE. The apparatus 1102 includes a reception component 1104, a configuration component 1106, a decoding component 1108, a RA component 1112, and a transmission component 1110.

The configuration component 1106 receives one or more configurations from a base station 1150 via signaling in a connected state. The RA component 1112 determines that a random access event has occurred in the connected state. The RA component 1112 selects a down-link reference signal transmitted from the base station and that is not quasi-colocated with a serving beam of from the base station to the UE. The RA component 1112 transmits a preamble sequence to the base station using random access sources indicating the selected down-link reference signal.

The decoding component 1108 determines, based on the one or more configurations, (a) resources of a first physical downlink control channel (PDCCH) indicating a first physical downlink shared channel (PDSCH) that contains a random access message or indicating an uplink grant for transmitting a random access message and (b) resources of a second PDCCH.

The decoding component 1108 determines, in a time domain, (a) that the first PDCCH overlaps with the second PDCCH, (b) that the first PDCCH overlaps with a second PDSCH that contains system data or user data and indicated by the second PDCCH, (c) that the first PDSCH overlaps with the second PDCCH, or (d) that the first PDSCH overlaps with the second PDSCH.

The decoding component 1108 determines that a first down-link reference signal for monitoring the first PDCCH and a second down-link reference signal for monitoring the second PDCCH are not quasi-colocated. In certain configurations, the first down-link reference signal is a channel state information reference signal or a synchronization signal block. The decoding component 1108 determines that monitoring the second PDCCH is an unexpected operation. The RA component 1112 receives, from the base station, the random access message on the second PDSCH on a beam that is different from the serving beam.

In certain circumstances, the first PDCCH overlaps with the second PDCCH. The UE monitors the first PDCCH. The UE refrains from monitoring the second PDCCH. In certain circumstances, the first PDCCH overlaps with the second PDSCH. The UE monitors the first PDCCH. The UE refrains from decoding the second PDSCH. In certain circumstances, the first PDSCH overlaps with the second PDCCH. The UE decodes the first PDSCH. The UE refrains from monitoring the second PDCCH. In certain circumstances, the first PDSCH overlaps with the second PDSCH. The UE decodes the first PDSCH. The UE refrains from decoding the second PDSCH.

In certain configurations, the first PDCCH is scrambled with a random access radio network temporary identifier (RA-RNTI) and the second PDCCH is scrambled with a radio network temporary identifier (RNTI) other than the RA-RNTI. In certain configurations, the first PDCCH is scrambled with a temporary cell radio network temporary identifier (TC-RNTI) and the second PDCCH is scrambled with a radio network temporary identifier (RNTI) other than the TC-RNTI. In certain configurations, the first PDCCH is located in a Type 1 PDCCH common search space set. The second PDCCH is located in a Type 0 PDCCH common search space set, a Type 0A PDCCH common search space set, a Type 2 PDCCH common search space set, a Type 3 PDCCH common search space set, or a UE specific PDCCH search space set.

Figure 12:
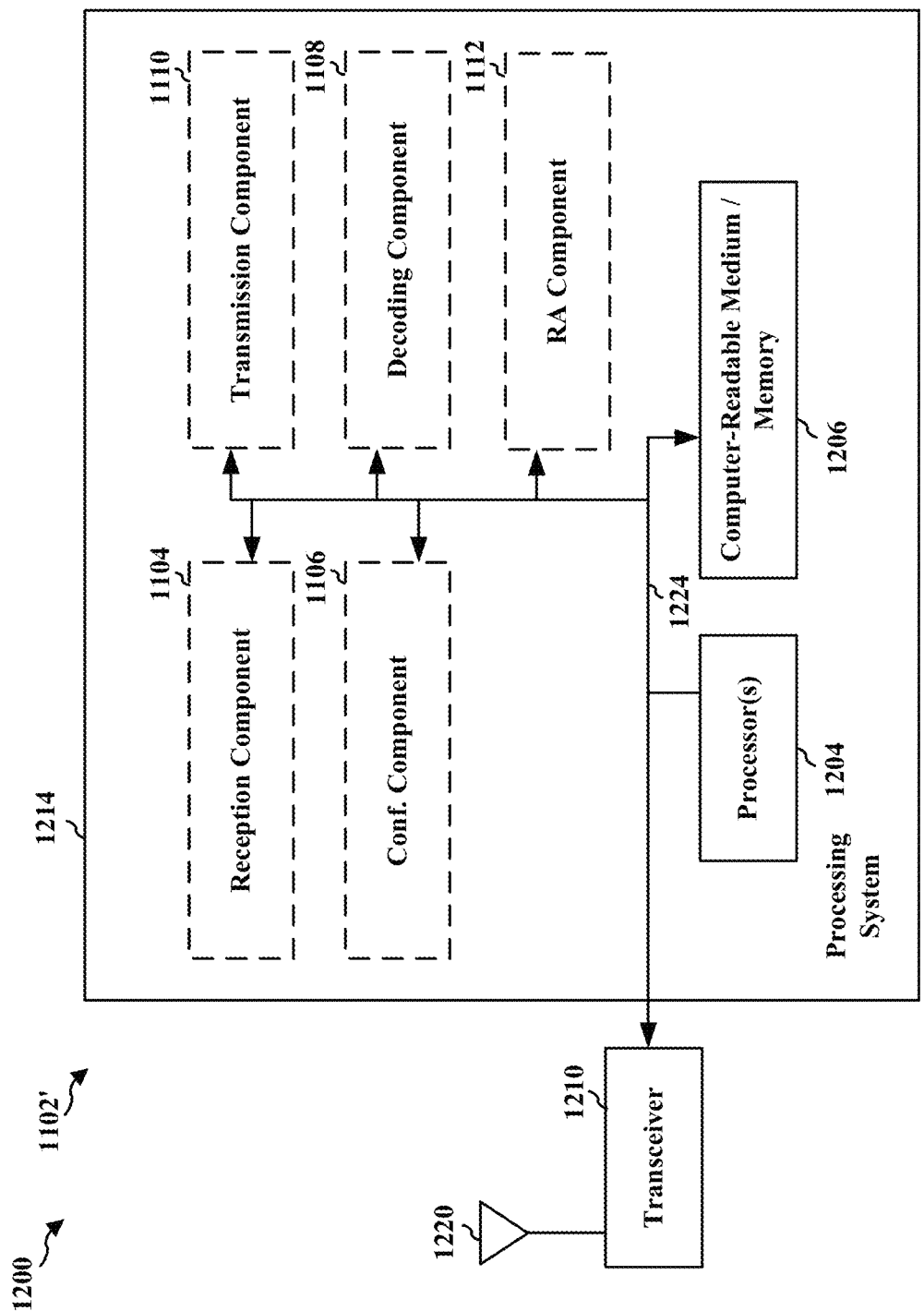
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The apparatus 1102' may be a UE. The processing system 1214 may be implemented with a bus architecture, represented generally by a bus 1224. The bus 1224 may include any number of interconnecting buses and bridges depending on the specific application of the processing system 1214 and the overall design constraints. The bus 1224 links together various circuits including one or more processors and/or hardware components, represented by one or more processors 1204, the reception component 1104, the configuration component 1106, the decoding component 1108, the transmission component 1110, the RA component 1112, and a computer-readable medium/memory 1206. The bus 1224 may also link various other circuits such as timing sources, peripherals, voltage regulators, and power management circuits, etc.

The processing system 1214 may be coupled to a transceiver 1210, which may be one or more of the transceivers 254. The transceiver 1210 is coupled to one or more antennas 1220, which may be the communication antennas 252.

The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220.

The processing system 1214 includes one or more processors 1204 coupled to a computer-readable medium/memory 1206. The one or more processors 1204 are responsible for general processing, including the execution of software stored on the computer-readable medium/memory 1206. The software, when executed by the one or more processors 1204, causes the processing system 1214 to perform the various functions described supra for any particular apparatus. The computer-readable medium/memory 1206 may also be used for storing data that is manipulated by the one or more processors 1204 when executing software. The processing system 1214 further includes at least one of the reception component 1104, the configuration component 1106, the decoding component 1108, the transmission component 1110, and the RA component 1112. The components may be software components running in the one or more processors 1204, resident/stored in the computer readable medium/memory 1206, one or more hardware components coupled to the one or more processors 1204, or some combination thereof. The processing system 1214 may be a component of the UE 250 and may include the memory 260 and/or at least one of the TX processor 268, the RX processor 256, and the communication processor 259.

In one configuration, the apparatus 1102/apparatus 1102' for wireless communication includes means for performing each of the operations of FIG. 10. The aforementioned means may be one or more of the aforementioned components of the apparatus 1102 and/or the processing system 1214 of the apparatus 1102' configured to perform the functions recited by the aforementioned means.

As described supra, the processing system 1214 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
receiving one or more configurations from a base station via signaling in a connected state;
determining, based on the one or more configurations, (a) resources of a first physical downlink control channel (PDCCH) indicating a first physical downlink shared channel (PDSCH) that contains a random access message or indicating an uplink grant for transmitting a random access message and (b) resources of a second PDCCH; and
(a) determining, in a time domain, that the first PDCCH overlaps with the second PDCCH, determining that a first down-link reference signal for monitoring the first PDCCH and a second down-link reference signal for monitoring the second PDCCH are not quasi-colocated, monitoring the first PDCCH, and refraining from monitoring the second PDCCH; or
(b) determining, in a time domain, that the first PDCCH overlaps with a second PDSCH that contains system data or user data and indicated by the second PDCCH, determining that the first down-link reference signal for monitoring the first PDCCH and the second down-link reference signal for monitoring the second PDCCH are not quasi-colocated, monitoring the first PDCCH, and refraining from decoding the second PDSCH; or
(c) determining, in a time domain, that the first PDSCH overlaps with the second PDCCH, determining that the first down-link reference signal for monitoring the first PDCCH and the second down-link reference signal for monitoring the second PDCCH are not quasi-colocated, decoding the first PDSCH, and refraining from monitoring the second PDCCH; or
(d) determining, in a time domain, that the first PDSCH overlaps with the second PDSCH, determining that the first down-link reference signal for monitoring the first PDCCH and the second down-link reference signal for monitoring the second PDCCH are not quasi-colocated, decoding the first PDSCH, and refraining from decoding the second PDSCH.

2. The method of claim 1, wherein the first PDCCH is scrambled with a random access radio network temporary identifier (RA-RNTI) and the second PDCCH is scrambled with a radio network temporary identifier (RNTI) other than the RA-RNTI.

3. The method of claim 1, wherein the first PDCCH is scrambled with a temporary cell radio network temporary identifier (TC-RNTI) and the second PDCCH is scrambled with a radio network temporary identifier (RNTI) other than the TC-RNTI.

4. The method of claim 1, wherein the first PDCCH is located in a Type 1 PDCCH common search space set, wherein the second PDCCH is located in a Type 0 PDCCH common search space set, a Type 0A PDCCH common search space set, a Type 2 PDCCH common search space set, a Type 3 PDCCH common search space set, or a UE specific PDCCH search space set.

5. The method of claim 1, wherein the first down-link reference signal is a channel state information reference signal or a synchronization signal block.

6. A method of wireless communication of a user equipment (UE), comprising:
receiving one or more configurations from a base station via signaling in a connected state;
determining, based on the one or more configurations, (a) resources of a first physical downlink control channel (PDCCH) indicating a first physical downlink shared channel (PDSCH) that contains a random access message or indicating an uplink grant for transmitting a random access message and (b) resources of a second PDCCH;
determining, in a time domain, (a) that the first PDCCH overlaps with the second PDCCH, (b) that the first PDCCH overlaps with a second PDSCH that contains system data or user data and indicated by the second PDCCH, (c) that the first PDSCH overlaps with the second PDCCH, or (d) that the first PDSCH overlaps with the second PDSCH;
determining that a first down-link reference signal for monitoring the first PDCCH and a second down-link reference signal for monitoring the second PDCCH are not quasi-colocated;
determining that a random access event has occurred in the connected state;
selecting a down-link reference signal transmitted from the base station and that is not quasi-colocated with a serving beam of from the base station to the UE;
transmitting a preamble sequence to the base station using random access sources indicating the selected down-link reference signal; and
receiving, from the base station, the random access message on the first PDSCH on a beam that is different from the serving beam when the resources of a first PDCCH indicating a first PDSCH.

7. An apparatus for wireless communication, the apparatus being a user equipment (UE), comprising:
a memory; and
at least one processor coupled to the memory and configured to:
receive one or more configurations from a base station via signaling in a connected state;
determine, based on the one or more configurations, (a) resources of a first physical downlink control channel (PDCCH) indicating a first physical downlink shared channel (PDSCH) that contains a random access message or indicating an uplink grant for transmitting a random access message and (b) resources of a second PDCCH; and
(a) determine, in a time domain, that the first PDCCH overlaps with the second PDCCH, determining that a first down-link reference signal for monitoring the first PDCCH and a second down-link reference signal for monitoring the second PDCCH are not quasi-colocated, monitoring the first PDCCH, and refraining from monitoring the second PDCCH, or
(b) determine, in a time domain, that the first PDCCH overlaps with a second PDSCH that contains system data or user data and indicated by the second PDCCH, determining that the first down-link reference signal for monitoring the first PDCCH and the second down-link reference signal for monitoring the second PDCCH are not quasi-colocated, monitoring the first PDCCH, and refraining from decoding the second PDSCH; or
(c) determine, in a time domain, that the first PDSCH overlaps with the second PDCCH, determining that the first down-link reference signal for monitoring the first PDCCH and the second down-link reference signal for monitoring the second PDCCH are not quasi-colocated, decoding the first PDSCH, and refraining from monitoring the second PDCCH; or (d) determine, in a time domain, that the first PDSCH overlaps with the second PDSCH, determining that the first down-link reference signal for monitoring the first PDCCH and the second down-link reference signal for monitoring the second PDCCH are not quasi-colocated, decoding the first PDSCH, and refraining from decoding the second PDSCH.

8. The apparatus of claim 7, wherein the first PDCCH is scrambled with a random access radio network temporary identifier (RA-RNTI) and the second PDCCH is scrambled with a radio network temporary identifier (RNTI) other than the RA-RNTI.

9. The apparatus of claim 7, wherein the first PDCCH is scrambled with a temporary cell radio network temporary identifier (TC-RNTI) and the second PDCCH is scrambled with a radio network temporary identifier (RNTI) other than the TC-RNTI.

10. The apparatus of claim 7, wherein the first PDCCH is located in a Type 1 PDCCH common search space set, wherein the second PDCCH is located in a Type 0 PDCCH common search space set, a Type 0A PDCCH common search space set, a Type 2 PDCCH common search space set, a Type 3 PDCCH common search space set, or a UE specific PDCCH search space set.

11. An apparatus for wireless communication, the apparatus being a user equipment (UE), comprising:
   a memory; and
   at least one processor coupled to the memory and configured to:
      receive one or more configurations from a base station via signaling in a connected state;
      determine, based on the one or more configurations, (a) resources of a first physical downlink control channel (PDCCH) indicating a first physical downlink shared channel (PDSCH) that contains a random access message or indicating an uplink grant for transmitting a random access message and (b) resources of a second PDCCH;
      determine, in a time domain, (a) that the first PDCCH overlaps with the second PDCCH, (b) that the first PDCCH overlaps with a second PDSCH that contains system data or user data and indicated by the second PDCCH, (c) that the first PDSCH overlaps with the second PDCCH, or (d) that the first PDSCH overlaps with the second PDSCH;
      determine that a first down-link reference signal for monitoring the first PDCCH and a second down-link reference signal for monitoring the second PDCCH are not quasi-colocated;
      determine that a random access event has occurred in the connected state;
      select a down-link reference signal transmitted from the base station and that is not quasi-colocated with a serving beam of from the base station to the UE;
      transmit a preamble sequence to the base station using random access sources indicating the selected down-link reference signal; and
      receive, from the base station, the random access message on the first PDSCH on a beam that is different from the serving beam when the resources of a first PDCCH indicating a first PDSCH.

12. A non-transitory computer-readable medium storing computer executable code for wireless communication of wireless equipment, comprising code to:
   determine, based on the one or more configurations, (a) resources of a first physical downlink control channel (PDCCH) indicating a first physical downlink shared channel (PDSCH) that contains a random access message or indicating an uplink grant for transmitting a random access message and (b) resources of a second PDCCH;

(a) determine, in a time domain, that the first PDCCH overlaps with the second PDCCH, determining that a first down-link reference signal for monitoring the first PDCCH and a second down-link reference signal for monitoring the second PDCCH are not quasi-colocated, monitoring the first PDCCH, and refraining from monitoring the second PDCCH; or (b) determine, in a time domain, that the first PDCCH overlaps with a second PDSCH that contains system data or user data and indicated by the second PDCCH, determining that the first down-link reference signal for monitoring the first PDCCH and the second down-link reference signal for monitoring the second PDCCH are not quasi-colocated, monitoring the first PDCCH, and refraining from decoding the second PDSCH; or (c) determine, in a time domain, that the first PDSCH overlaps with the second PDCCH, determining that the first down-link reference signal for monitoring the first PDCCH and the second down-link reference signal for monitoring the second PDCCH are not quasi-colocated, decoding the first PDSCH, and refraining from monitoring the second PDCCH; or (d) determine, in a time domain, that the first PDSCH overlaps with the second PDSCH, determining that the first down-link reference signal for monitoring the first PDCCH and the second down-link reference signal for monitoring the second PDCCH are not quasi-colocated, decoding the first PDSCH, and refraining from decoding the second PDSCH.

* * * * *